United States Patent
Compton

(10) Patent No.: US 10,352,702 B2
(45) Date of Patent: Jul. 16, 2019

(54) FULLY RECIPROCAL ATOMIC INTERFEROMETRIC GYROSCOPE

(71) Applicant: Honeywell International Inc., Morris Plains, NJ (US)

(72) Inventor: Robert Compton, Loretto, MN (US)

(73) Assignee: Honeywell International Inc., Morris Plains, NJ (US)

( * ) Notice: Subject to any disclaimer, the term of this patent is extended or adjusted under 35 U.S.C. 154(b) by 24 days.

(21) Appl. No.: 15/418,990

(22) Filed: Jan. 30, 2017

(65) Prior Publication Data
US 2018/0066942 A1    Mar. 8, 2018

Related U.S. Application Data

(60) Provisional application No. 62/382,894, filed on Sep. 2, 2016.

(51) Int. Cl.
*G01C 19/58* (2006.01)
*G01C 19/64* (2006.01)

(52) U.S. Cl.
CPC .............. *G01C 19/64* (2013.01); *G01C 19/58* (2013.01)

(58) Field of Classification Search
CPC ......... G01C 19/58; G01P 15/02; G21K 1/006; G01V 7/00; H05H 3/02
See application file for complete search history.

(56) References Cited

U.S. PATENT DOCUMENTS

| | | | | |
|---|---|---|---|---|
| 3,761,721 A | * | 9/1973 | Altshuler | G01C 19/58 101/104 |
| 4,992,656 A | * | 2/1991 | Clauser | G01C 19/58 250/251 |
| 5,274,231 A | * | 12/1993 | Chu | G01C 19/58 250/251 |

(Continued)

FOREIGN PATENT DOCUMENTS

| EP | 2679953 | 1/2014 |
|---|---|---|
| EP | 3034463 | 6/2016 |

OTHER PUBLICATIONS

European Patent Office, "Extended European Search Report for EP Application No. 17186754.2", "Foreign counterpart to U.S. Appl. No. 15/418,990", dated Jan. 26, 2018, pp. 1-9, Published in: EP.

(Continued)

*Primary Examiner* — Nicole M Ippolito
*Assistant Examiner* — Sean M Luck
(74) *Attorney, Agent, or Firm* — Fogg & Powers LLC

(57) ABSTRACT

A fully reciprocal atomic interferometric gyroscope is provided. The fully reciprocal atomic interferometric gyroscope includes an atomic chamber, a plurality of lasers, a controller and measurement sensor. The atomic chamber is used to hold an atom cloud. The plurality of lasers are selectively positioned to selectively direct laser beams into the atomic chamber. The controller is configured to control the plurality lasers to initially cool the atom cloud to a point where at least one optical lattice can be formed that is used to move wave function halves of atoms of the atom cloud along split wave function paths that form an interferometer cycle. The measurement sensor is configured to conduct a phase readout of a wave function upon the completion of at least one interferometer cycle around the split wave function paths.

12 Claims, 9 Drawing Sheets

(56) References Cited

U.S. PATENT DOCUMENTS

| | | | | |
|---|---|---|---|---|
| 6,314,809 | B1* | 11/2001 | Kasevich | G01V 7/00 |
| | | | | 73/382 R |
| 6,476,383 | B1* | 11/2002 | Esslinger | G21K 1/00 |
| | | | | 250/251 |
| 7,030,370 | B1 | 4/2006 | Crookston et al. | |
| 8,860,933 | B2 | 10/2014 | Compton et al. | |
| 9,019,506 | B1 | 4/2015 | Black et al. | |
| 9,030,655 | B2 | 5/2015 | Strabley et al. | |
| 9,175,960 | B1 | 11/2015 | Compton | |
| 2009/0242743 | A1* | 10/2009 | Bouyer | H05H 3/02 |
| | | | | 250/251 |
| 2010/0149541 | A1* | 6/2010 | Aarons | G01C 19/58 |
| | | | | 356/450 |
| 2010/0180680 | A1* | 7/2010 | Zaugg | G01V 7/00 |
| | | | | 73/382 G |
| 2010/0312468 | A1* | 12/2010 | Withanawasam | B81B 7/02 |
| | | | | 701/408 |
| 2011/0073753 | A1* | 3/2011 | Bouyer | G01C 19/58 |
| | | | | 250/251 |
| 2013/0213135 | A1 | 8/2013 | Compton et al. | |
| 2014/0022534 | A1 | 1/2014 | Strabley et al. | |
| 2014/0375998 | A1* | 12/2014 | Kasevich | G01B 9/02001 |
| | | | | 356/450 |
| 2015/0090028 | A1* | 4/2015 | Zahzam | G21K 1/006 |
| | | | | 73/382 R |
| 2016/0216114 | A1 | 7/2016 | Kotru et al. | |
| 2018/0066942 | A1* | 3/2018 | Compton | G01C 19/58 |

OTHER PUBLICATIONS

Muller et al, "A Compact Dual Atom Interferometer Gyroscope Based on Laser-cooled Rubidium", "The European Physical Journal D", May 1, 2009, p. 273-281, Publisher: EDP Sciences.

Muller et al, "Atom Interferometers with Scalable Enclosed Area", "Physical Review Letters 102, 240403", Jun. 19, 2009, pp. 240403-1-240403-4, Publisher: The American Physical Society.

Von Klitzing, "Time Averaged Adiabatic Potentials (TAAP)", "Atomtronics, Cretan Matter-Waves Group, Forth IESL", May 6, 2015, pp. 1-86, vol. 998.

European Patent Office; "Communication pursuant to Article 94(3) EPC from EP Application No. 17186754.2, dated Nov. 21, 2018"; from Foreign Counterpart of U.S. Appl. No. 15/418,990; pp. 1-6; dated Nov. 12, 2018; Published: EP.

European Patent Office, "Communication under Rule 71(3) from EP Application No. 17186754.2 dated Apr. 10, 2019", from Foreign Counterpart to U.S. Appl. No. 15/418,990, pp. 138, Published: EP.

* cited by examiner

FULLY RECIPROCAL ATOMIC INTERFEROMETRIC GYROSCOPE

CROSS-REFERENCE TO RELATED APPLICATIONS

This Application claims priority to U.S. Provisional Application Ser. No. 62/382,894, same title herewith, filed on Sep. 2, 2016, which is incorporated in its entirety herein by reference.

BACKGROUND

Atomic interferometer based gyroscopes represent a possible route to high stability rotation sensing that can provide navigation solutions in situations where satellite based navigation has become degraded or is not available. In an atomic interferometer, the wave equation for an atom is split in half and the interferometer causes the two halves of that wave to travel different paths. The two halves are then recombined. When the halves are recombined, the two wave halves may have accumulated a relative phase difference with respect to each other so that a phase measurement can be measured from an output of the interferometer. High precision gyroscopes using other inertial sensor technologies exist, but they are appreciably more expensive to manufacture than atomic interferometer based devices. One problem with atomic interferometer devices, however, is that factors other than rotation can affect the phase differences in the split waves accumulated before recombination, leading to measurement errors in the output of the gyroscope. For example, the phase accumulation in an atomic interferometer is a function of both rotation perpendicular to the plane of path separation and linear acceleration along the direction of path separation, experienced by the atoms during the time they are traversing the interferometer as a split wave equation. Also, if there are imperfections in the interferometer or external field gradients, anything in addition to rotation and linear acceleration that causes one path of the interferometer to look different than the other path of the interferometer may accumulate a phase difference. Phase accumulation from such phenomena are indistinguishable from inertially induced phase rotation as observed from the output of the atomic interferometer gyroscope.

For the reasons stated above and for other reasons stated below which will become apparent to those skilled in the art upon reading and understanding the specification, there is a need in the art for system and methods for Fully Reciprocal Atomic Interferometric Gyroscopes.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a fully reciprocal atomic interferometric gyroscope is provided. The fully reciprocal atomic interferometric gyroscope includes an atomic chamber, a plurality of lasers, a controller and measurement sensor. The atomic chamber is used to hold an atom cloud. The plurality of lasers are selectively positioned to selectively direct laser beams into the atomic chamber. The controller is configured to control the plurality of lasers to initially cool the atom cloud to a point where at least one optical lattice can be formed that is used to move wave function halves of the atoms of the atom cloud along split wave function paths that form an interferometer cycle. The measurement sensor is configured to conduct a phase readout of a wave function upon the completion of at least one interferometer cycle around the split wave function paths.

In another embodiment, a method of forming a fully reciprocal atomic interferometric gyroscope is provided. The method includes cooling atoms of an atomic cloud held in a chamber. Once cooled, each atom is split into a first atomic wave function half and a second atomic wave function half at a point of separation. At least one optical lattice is used to move the first atomic wave function half along a first split wave function path and the second atomic wave function half along a second split wave function path in a first direction along a plane that is transverse to a rotation axis along which rotation sensing is desired. The first split wave function path and the second split wave function path are caused to intersect with each other to complete a first half of an interferometer cycle a select distance from the point of separation. The at least one optical lattice is used at least in part to move the first atomic wave function half along the second split wave function path and the second atomic wave function half along the first split wave function path in a second direction along the plane back to the point of separation to complete an interferometer cycle. A phase readout is conducted after at least one complete interferometer cycle.

In yet another embodiment, another method of forming a fully reciprocal atomic interferometric gyroscope is provided. The method includes cooling atoms of an atom cloud held in a chamber until an optical lattice can be formed. A first optical lattice is used to move an atomic wave function of atoms of the cooled atom cloud in a first direction along a plane that is transverse to a rotational axis along which rotation sensing is desired. Each atom is split into a first atomic wave function half and a second wave function half at a point of separation. A pair of overlapping second optical lattices are used to control a separation distance of the first atomic wave function half from the second wave function half so the first atomic wave function half travels along a first split wave function path and the second wave function half travels along a second wave function path in the first direction. The pair of overlapping second optical lattices cause the first split wave function path and the second wave function path to intersect to complete a first half of an interferometer cycle at an intersection point that is a select distance from the point of separation. Upon reaching the intersection point, the first optical lattice is used to change movement of the first atomic wave function half and the second wave function half in a second direction that is opposite the first direction and using the pair of overlapping second optical lattices to cause the first atomic wave function half to move along the second split wave function path and the second atomic wave function half to move along the first split wave function path back to the point of separation to complete an interferometer cycle. A phase readout is then conducted.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address one or more of the above mentioned deficiencies through a fully reciprocal large momentum transfer (LMT) gyroscope that operates using a Sagnac interferometer geometry. As the term is used herein, a LMT gyroscope comprises any atomic interferometer whose arms differ by more than two photon recoils of velocity. LMT atomic interferometer gyroscopes have the potential to provide low cost rotation sensing at better than navigation-grade performance. In a fully reciprocal interferometer, the two halves of the atomic or optical wave-packet will traverse exactly the same path in opposite directions, and return to the starting point for phase readout. Ring laser gyros and fiber optical gyros are examples of (non-atomic interferometer) fully reciprocal gyroscopes.

Embodiments of the present disclosure provide fully reciprocal LMT gyroscopes that use at least one optical lattice to guide the motion of atoms along the direction that is transverse to their separation vector. Normally, motion along this direction would depend only upon initial conditions, such as the velocity of an atomic beam, or the velocity with which a cold sample of atoms is launched. As described herein, velocity along the transverse direction is controlled using at least one moving optical lattice. These embodiments execute a first interferometer half cycle, then reverse the motion of the transverse optical lattice and repeat to perform a compete interferometer cycle, resulting in full reversal of the arms of the interferometer. This approach has the benefit of reducing noise and drift, improving both ARW and stability of the gyroscope.

Using a Sagnac interferometer geometry in an embodiment, an input beam splitting element that divides the atomic wave function is co-located with the output beam recombining element that recombines the atomic wave function. Therefore, the quantum-mechanical wave function after it is divided will have both halves traverse the same trajectory, just in opposite rotational direction. The accumulated phase shift therefore is a function of rotation perpendicular to the plane in which the quantum-mechanical wave function separation occurs, and the geometry subtracts out not only imperfections in the paths, but also eliminates contributions due to linear acceleration along the direction of path separation.

Figure 1:
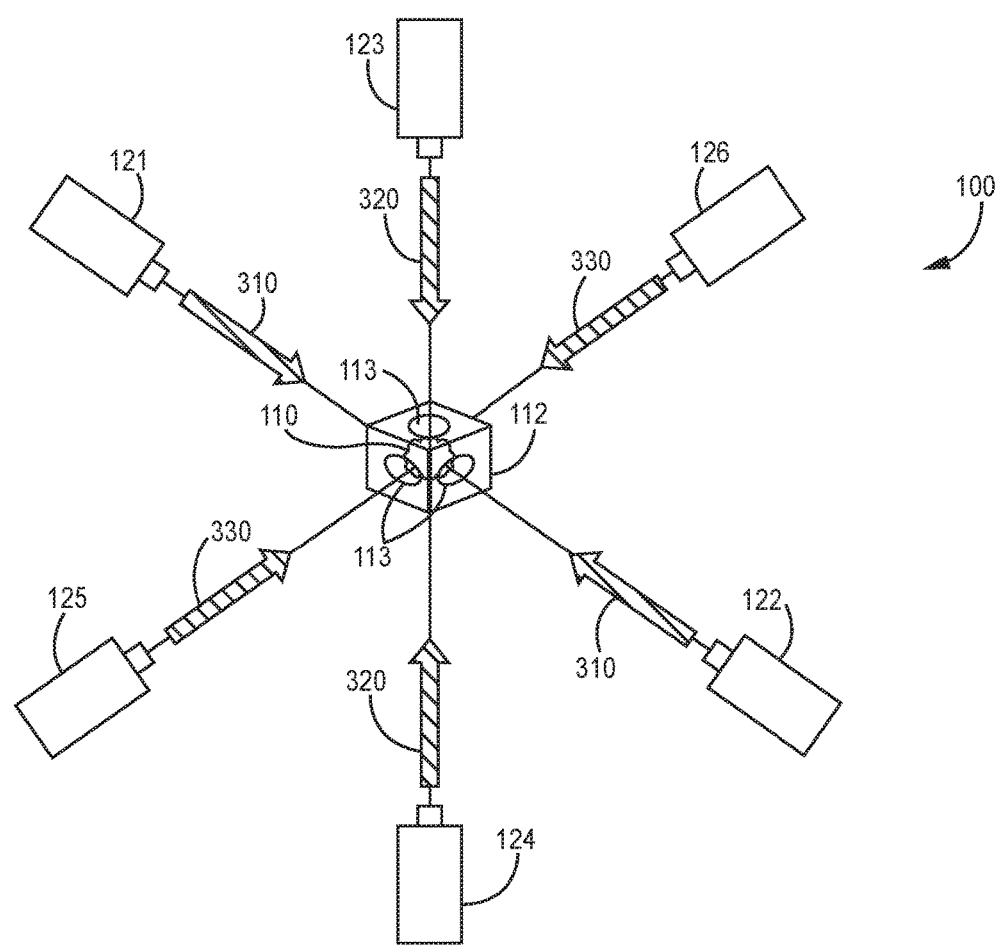
FIG. 1 is a diagram of a fully reciprocal atomic interferometric gyroscope of one embodiment of the present disclosure.

FIG. 1 is a simplified diagram illustrating operation of an atomic interferometer gyroscope 100 of one embodiment of the present disclosure. In the operation of such an atomic gyroscope, a sample of cold atoms is created such as through laser cooling. This sample of cold atoms is referred to herein as a cold atom cloud 110 and is best seen in FIG. 1. In some embodiments, the cold atom cloud 110 is maintained inside an atomic chamber 112 that includes 6 orthogonally oriented windows 113. The atoms of the cold atom cloud 110 are typically alkali atoms and in some embodiments, the cold atom cloud 110 may comprise rubidium or cesium atoms. In one embodiment, the laser cooling cools the atoms of cloud 110 down to a temperature of approximately 1 micro-Kelvin. Once cooled, the cooling lasers are turned off and a beam splitter pulse (such as a Bragg or Raman pulse) is applied to the cold atom cloud 110 to load into at least one optical lattice as generally illustrated FIG. 2. The cold atom cloud 110 is subjected to optical pulses from laser sources 121-126 (each of which send laser light beams into a respective one of the windows 113) to form an inertial sensor. Laser sources 121 and 122 are mutually aligned to apply a first set of laser beams along a first axis from opposing directions into the cold atom cloud 110. Laser sources 123 and 124 are mutually aligned to apply a second set of laser beams along a second axis from opposing directions into the cold atom cloud 110, where the second axis is orthogonal to the first axis. Laser sources 125 and 126 are mutually aligned to apply a third set of laser beams along a third axis from opposing directions into cloud 110, where the third axis is orthogonal to the first axis and second axis. The first, second and third axes define the sensing x, y and z Cartesian axes of gyroscope 100. In alternate embodiments, any of the laser sources discussed here may be implemented using a distributed Bragg reflector (DBR), a vertical-cavity surface-emitting laser (VCSEL), or similar laser emitting devices. In some embodiments the laser sources may be laser producing devices themselves, or may simply output laser light directed to them from laser light generating devices (such as via beam splitters and/or mirrors, for example) with which they are in optical communication. In alternate implementations, the two or more of the beams 310, 320 and 330 may be derived from the same laser device. In one embodiment, gyroscope 100 includes a laser controller, such as controller 902 of FIG. 9, that is coupled to and/or controls operation of the various laser sources and beams and laser beam frequency shifting described herein. In one embodiment, laser controller 902 includes logic to operate the lasers to form and operate the optical lattices discussed herein, perform the cooling cycles discussed herein, and/or measure phase accumulation to derive rotation rates.

The lasers are applied into the windows of chamber 112 at a frequency that provides laser cooling which cools and traps the sample of atoms 110 to very low temperatures using combinations of laser cooling (e.g. a magneto-optical trap), optical molasses and Raman cooling or Raman Velocity Selection. With combinations of these cooling techniques, temperatures can be reached that are sub micro-Kelvin and sub-recoil. The resulting velocity spread of the atoms is less than the velocity imparted to an atom by a scattering event with a photon (i.e., sub-photon recoil temperatures). For example, laser cooling can get the atom cloud down to 50 micro-Kelvin, optical molasses can then drop the temperatures to about 5 micro-Kelvin, and Raman cooling can achieve temperatures below 500 nano-Kelvin.

With the embodiments of the present disclosure, after the atom cloud 110 is cooled, interfering laser beams of offsetting frequency are applied into the chamber to create at least one optical lattice. In an embodiment, resulting laser intensity is highest, for a red detuned lattice. Typically in embodiments, a blue detuned lattice is used. The laser intensity is lowest at the minimum of the potential, but the overall potential well has the same depth as for a red detuned lattice. Each optical lattice creates an energy/potential well for the atoms. By slightly detuning the relative frequency difference of the two interfering laser beams that form an optical lattice, the lattice begins to move and the atoms trapped in various antinodes of the lattice potential will begin to accelerate with it. In this way the motion of the atoms can be controlled by sweeping the laser frequencies. It should be appreciated that in some embodiments, the interfering laser beams may each be produced by two separate laser sources 121-126, or alternatively light from a single one of the laser sources 121-126 may be applied to a splitter and the frequencies of the resulting split beams de-tuned with respect to each other before being applied into the chamber 112. It should be appreciated that during the laser cooling process to cool the atom cloud 110, the laser sources 121-126 may each be on and applying light into the chamber 112. However, during operation of the optical lattice, only those lasers provide beams for operating the lattice as described herein would be supplying light into the chamber 112. The remaining lasers may be off, or simply have their laser light re-directed to not enter the chamber 112.

Figure 2:
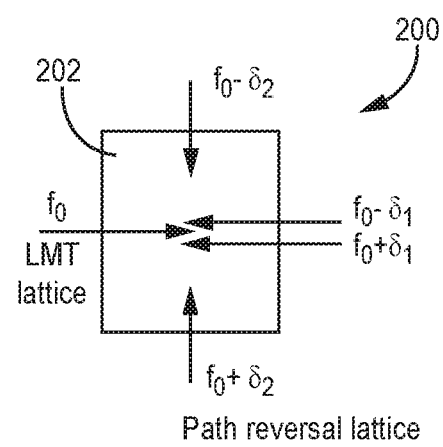
FIG. 2 is a diagram illustrating direction of laser beams and a sensing plane in which an optical lattice is established within the gyroscope of FIG. 1.

In establishing an optical lattice, a plane 202 is selected in which to create the interferometer split wave-function paths, and that plane 202 will be perpendicular to the rotation axis along which rotation sensing is desired. FIG. 2 is a representative diagram 200 illustrating laser beams used to form optical lattices and the sensing plane 202. FIG. 2 shows the orientation of vertical beams $f_0+\delta_2$ and $f_0-\delta_2$ that form a single vertical optical lattice and horizontal beams $f_0$ and $f_0+\delta_1$ and $f_0-\delta_1$ that form overlapping horizontal optical lattices in one embodiment. The single vertical lattice translates the entire atomic sample upward or downward along the vertical direction and the overlapping horizontal optical lattices initiate and increase the path separation as further discussed below in detail. Note that the term horizontal and vertical are used to aid in the understanding of the embodiment. The vertical optical lattice and the horizontal optical lattices can be formed in any direction that may be orthogonal to each other in an embodiment.

Figures 3A, 3B:
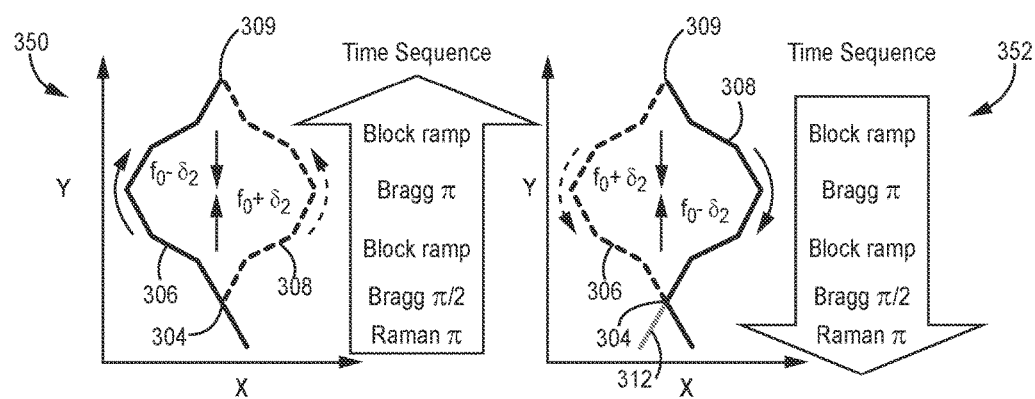
FIG. 3A-3C illustrate the operation of optical lattices to implement the fully reciprocal atomic interferometer of FIG. 1.
Figure 3C:
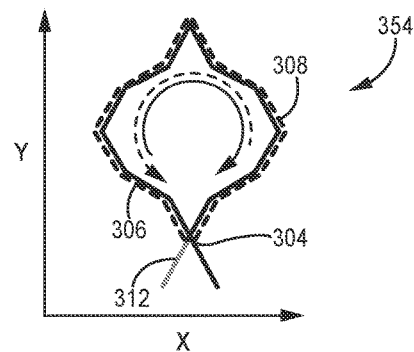

As discussed, the three laser beams $f_0$ and $f_0+\delta_1$ and $f_0-\delta_1$ entering plane 202 along the horizontal create two overlapping optical lattices. Those overlapping lattices facilitate the separation of the atomic wave function of the atoms in cloud 110 along the x axis as illustrated in FIGS. 3A, 3B and 3C along the horizontal direction. FIGS. 3A, 3B and 3C illustrate operation of a fully reciprocal LMT gyroscope. FIG. 3A illustrates a first half of a Sagnac loop 350. Note that with this embodiment, there is no readout pulse at the upper junction. In FIG. 3B, the second half of the Sagnac loop 352 is illustrated, with path reversal and final readout at initial beam-splitter position (point of separation 304). FIG. 3C illustrates a complete cycle 354 where the transverse (y-axis) lattice moves in the positive y-direction during the first half of the interferometer, and in the negative y-direction during the second half of the cycle. The atoms are returned to the input beam-splitter for final readout. The final Raman beam maps atomic phase to internal state populations.

The two lattice beams shown entering plane 202 along the vertical are formed by counter-propagating lasers that facilitate an optical lattice that controls the motion of the atoms along the vertical direction (y axis). In one embodiment, the vertical lasers ($f_0+\delta_2$, $f_0-\delta_2$) are shown into opposing windows of chamber 112 that are orthogonally positioned with respect to windows of chamber 112 in which the horizontal lasers ($f_0$, $f_0+\delta_1$, $f_0-\delta_1$) are shown through.

In FIG. 3A, the frequency of the vertical lasers cause the atoms to move vertically upward, and in FIG. 3B, the frequencies are reversed to cause the atoms to move vertically downward. The laser with frequency $f_0-\delta_2$ in the first half switches to the frequency $f_0+\delta_2$ in the second half and vice versa. In each case, as the atoms are moving vertically upward and downward, the horizontal lattice beams are causing the paths to expand outward and inward. That is, as the $\delta_1$ value is varied, the two horizontal optical lattices, and thus the paths of the atomic wave function followed by the atoms (as they move from bottom to top and top to bottom) spread and contract in the horizontal (x) direction as a function of $\delta_1$. In some embodiments, the $\delta_1$ values are linearly swept through a ramp. The $\delta_1$ value ramp increases and then decreases during the lower half of the loop shown in FIG. 3A. The $\delta_1$ value ramp then increases and then decreases during the upper half of the loop shown in FIG. 3A. When $\delta_1$ is increasing, the lattice is accelerating the atoms. Then, before the paths can be brought back together again, the lattice decelerates the atoms by decreasing the value of $\delta_1$. The interferometer ramps up in $\delta_1$ accelerating the rate of separation of the two wave function paths (also referred to as arms) then it ramps $\delta_1$ back down to decelerate the rate of separation of the two wave function paths (but the two paths are still increasing in separation distance). When they reach the outermost point of separation, then the interferometer ramps $\delta_1$ up again and down again to reach the top where the two paths rejoin again. Illustrated in FIG. 3B, this ramp-up and ramp-down in $\delta_1$ is then repeated two more times with the $f_0+\delta_2$, $f_0-\delta_2$ vertical lasers now swapped in frequency so that the vertical optical lattice brings the atoms back down back to the point where the wave function was first split.

The ramping of $\delta_1$ up and down may be referred to as Bloch oscillations and is a way of coherently accelerating the atoms so that they increase their velocity in steps of two photons worth of momentum (or two velocity recoils), so it is a very controlled acceleration of the atoms outward, and then back inward. $F_0$ is the laser frequency (e.g. 380 THz) with $\delta_2$ being a very small shift in that frequency that is 10-100 kHz (for example) and by making small changes in the frequencies, the standing wave begins to move. By reversing the sign of that shift, the standing wave beings to move in the opposite direction. The velocity of the atoms is quantized in units of photon recoils (photon recoil velocity) so the range of accelerations is not continuous, but instead changes in discrete steps. In FIGS. 3A-3C, each Bloch oscillation results in two recoils of momentum transfer for each path, for a total of four recoils increase in path separation velocity.

Further regarding the time sequence shown in FIG. 3A, π indicates that the atoms are making a complete transition between quantum states of the atom, which can include either internal states, or momentum states, or both. π/2 indicates that the atoms are making a half of a complete transition between quantum states of the atom, resulting in a superposition of two states. The initial Raman π corresponds to the Raman velocity selection step and indicates that at this point there is a full transition between hyperfine internal ground states between F=1 and F=2 in rubidium atomic cloud example and F=3 and F=4 in a cesium atomic cloud example, where F is the hyperfine state. When that is done, a cold population of the atoms becomes selected and placed into the optical lattice, initializing the atom cloud 112 to a well-define internal state and a well-defined momentum state. In this case, FIG. 3A shows that atom cloud 112 is initialized into an initial state that has an initial velocity of 2 photon recoils (shown by line already coming in at an angle) already having motion in the −x direction. With the atoms staying at the F=1 ground state for the rest of the cycle until read-out, momentum states are altered by various laser pulses. A Bragg π/2 pulse places the atoms into a superposition of momentum states that have −2 recoils (along the path of the original angled line to the left) and +2 recoils (for the second path splitting off to the right). As such, the Bragg π/2 pulse function essentially as a beam splitter. The Bragg pulse, in this example, is a flashing on of the optical lattice with $\delta_1=0$. By flashing a Bragg pulse for only half of the time needed for a full transition, a Bragg π/2 pulse is achieved. This pulse creates a grating where the atoms diffract from the optical intensity grating and half of the atomic wave function for each individual atom is placed into the +2 recoil state and the other half placed in the −2 recoil state (i.e., the superposition of two momentum states). This step is indicated in block (406) of FIG. 4. The Bloch oscillations are then performed by ramping of $\delta_1$ up and down. At the point of maximum separation, a Bragg π pulse is applied, essentially reversing the recoil states so that the +2 recoil states become −2 and the −2 recoil states become +2 recoil states after which the Bloch oscillations are then repeated by performing a second ramping of $\delta_1$ up and down. At the point when the paths of the split atomic wave function paths intersect, the $f_0+\delta_2$, $f_0-\delta_2$ vertical lasers are swapped in frequency to bring down the vertical optical lattice (and transitioning to FIG. 3B). The Bloch oscillations are then performed by ramping of $\delta_1$ up and down. Again at the point of maximum separation in FIG. 3B, a Bragg π pulse is applied (i.e. a Bragg pulse for a full π duration), essentially again reversing the recoil states so that the +2 recoil states become −2 and the −2 recoil states become +2 recoil states and the Bloch oscillations are then again performed by ramping of $\delta_1$ up and down. At the same location that the atomic waveform was initially split, a second Bragg π/2 pulse now rejoins the atomic wave function. In the absence of relative phase shifts between the two paths, the second Bragg π/2 would take the atoms out of the superposition of momentum states, essentially completing a full Bragg π transition. Again, the Bragg π/2 pulse functions essentially as a beam splitter, but in this stage inversed to now join two beams. Any relative phase now appearing in the atomic wave function will result in a final superposition of momentum states that can be mapped back on to internal states by the final Raman π pulse, and read out using resonant absorption or fluorescent techniques well known to those who are practiced in the art. Because of the fully reciprocal nature of this interferometer, the final phase will strictly be a function of rotation measured along the sense axis (i.e. normal to plane 202).

It should be appreciated that each of the three horizontal lasers ($f_0$, $f_0+\delta_1$, $f_0-\delta_1$) can be independently produced by different laser sources 121-126. Alternatively each can begin by being generated by a common laser source (which may be one of the laser sources 121-126 but may instead be another laser source) and passed (for example) though an acousto-optic modulator that is driven to produce the two $f_0+\delta_1$, $f_0-\delta_1$ laser light beams shifted from the $f_0$. The laser beams at $f_0+\delta_2$, $f_0-\delta_2$ generating the optical lattice in the vertical direction can be similarly produced from one or more of the laser sources 121-126 or by another laser source and shifted using an acousto-optic modulator.

Moreover, in one embodiment, the transverse optical lattice uses frequency stabilized lasers that are locked within ~10 GHz of the atomic transition. Higher frequency offsets are possible, but would require more power. Lower offsets are possible but would result in reduced atomic coherence. Counter-propagating beams have a frequency difference that is ~10 kHz, and undergo a ramping profile to accelerate, decelerate and reverse the direction of the atoms along the axis that is transverse to the axis of path separation, as explained below.

FIGS. 3A and 3B are combined in FIG. 3C illustrating that as one half of the atomic wave function circulates entirely around the path in a clockwise direction, the other half of the atomic wave function circulates entirely around the path in the counter-clockwise direction (thus performing a fully reciprocal operation). Furthermore, the two wave function paths will reach a point of recombination precisely at the starting where they were previously split. From there, the recombined beams are read out to obtain an atomic phase measurement that will represent a component of rotation with respect to the axis normal to plane 202. In one alternate embodiment, during each measurement cycle, the interferometer may cycle the vertical optical lattice upward (FIG. 3A) and downward (FIG. 3B) multiple times (up to as many time as the atom coherence will allow) before a phase measurement is obtained to increase the sensitivity of the gyroscope 100. In such an embodiment, each time the vertical optical lattice fulfills such a full reciprocal cycle, the rotational sensitivity of the gyroscope is increased.

Alkali atoms, such as rubidium, have a single valence electron that is very sensitive to the laser pulses. That electron has a ground state with 2 hyperfine ground state possibilities (F=1 or F=2 for rubidium). To perform laser cooling laser light is directed onto the atoms with a frequency that is slightly (a few MHz) red detuned with respect to the transition from F=2 ground state to F=3 excited state. The magnitude of red detuning is increased and the magnetic field coils are turned off in order to enter into the optical molasses cooling regime. Raman velocity selection utilizes two lasers, one tuned to the F=2 transition and the other to the F=1 to excited state transition. At that step, the two lasers have a frequency difference that bridges the hyperfine splitting (6.8 GHz in the case of Rubidium or 9.2 in the case of Cesium). The Raman pi pulse selects a population that is very cold and transfers it between F=1 and F=2. To implement an optical lattice, two laser beams are used, as in the Raman case, but their relative frequency difference is reduced to 10's of kHz and they are both detuned from the F=1 to excited state transition by several GHz (e.g. 10 GHz detuned).

Figure 4:
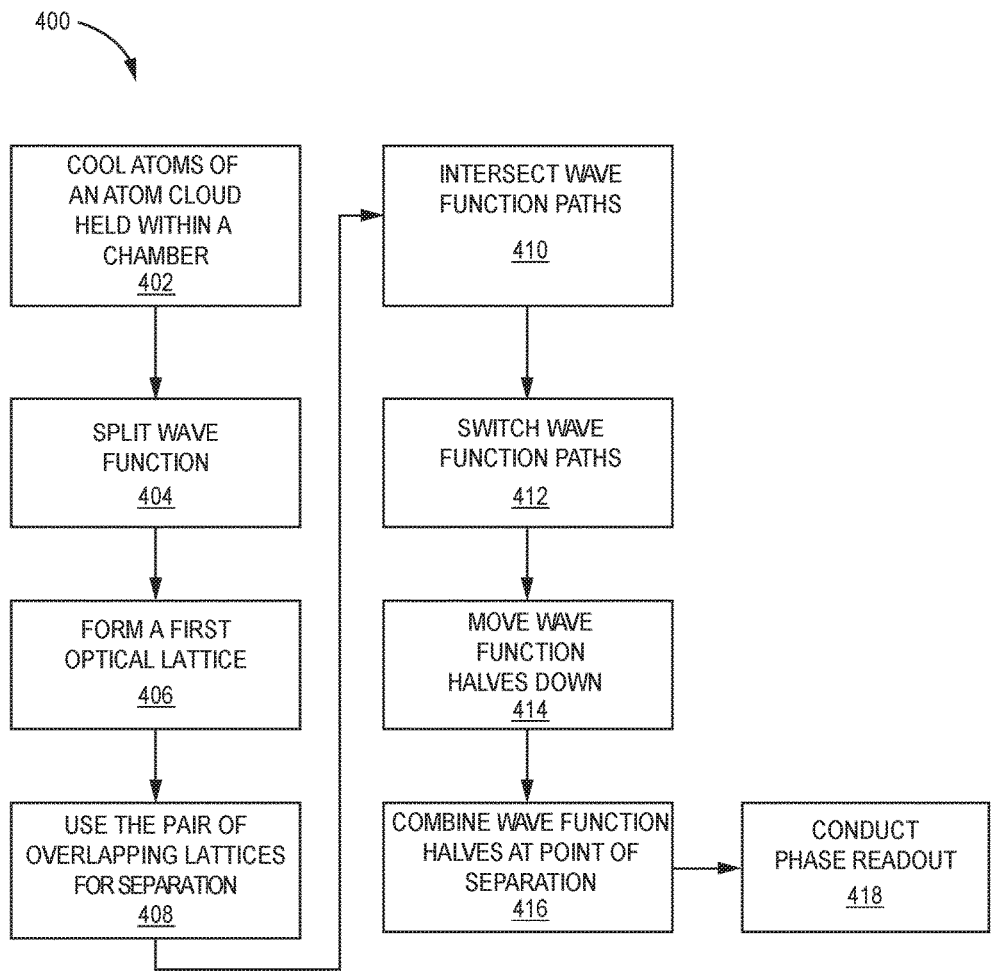
FIG. 4 is an atomic interferometer gyroscope flow diagram of one embodiment.

One method of implementing an atomic interferometer gyroscope is illustrated in the flow diagram 400 provided in FIG. 4 in view of FIGS. 1 through 3. In summary, the process starts by cooling the atoms of an atomic cloud held in the chamber 112 (402). In an embodiment, the atoms are cooled to a point where a velocity spread of the atoms is less than a velocity imparted to an atom by a scattering event with a photon. Each atom is then split into a first atomic wave function half and a second atomic wave function half (404) at point of separation 304. In an embodiment, this is done by placing each atom in a superposition of two momentum states by flashing an initial optical lattice (such as a lattice formed by beams $f_0$ and one of $f_0+\delta_1$ or $f_0-\delta_1$ illustrated in FIG. 2) with a half of a Bragg pulse. A first optical lattice is formed creating a moving wave form a first direction (which is a vertical direction in the illustration) (406). This is best illustrated in FIG. 3A. In an embodiment, this is done with opposing beams $f_0+\delta_2$ and $f_0-\delta_2$ as illustrated in FIG. 2 and described above. A pair of overlapping lattices are then used to separate the first atomic wave function half and the second atomic wave function half into two different paths, a first split wave function path 306 and a second split wave function half path 308 from the point of separation 304 is illustrated in FIG. 3A (408). The first optical lattice moves the first atomic wave function half and the second atomic wave function half in the first direction up a respective first split wave function path 306 and a second split wave function path 308 while the pair of overlapping lattices control the separation of the first split wave function path 306 and the second split wave function path 308 from each other. At a select distance, from the point of separation 304, the pair of overlapping lattices cause the first split wave function path 306 and the second split wave function path 308 to intersect at an intersection point 309 (410). At this point, a first half of an interferometer cycle is compete. While the pair of overlapping optical lattices are switching the wave function paths (412) (i.e., the first atomic wave function half is switched to the second split wave function path 306 and the second atomic wave function half is switched to the first split wave function path 304), the first optical lattice switches direction to move the first atomic wave function half and the second atomic wave function half back to the point of separation 304 (414). This is illustrated in FIG. 3B. Reversing the direction of the first optical lattice is accomplished by switching opposing beams $f_0+\delta_2$ and $f_0-\delta_2$ as discussed above. As the first atomic wave function half and the second atomic wave function half back move towards the point of separation 304, the overlapping optical lattices control the separation to follow the first split wave function path 306 and the second split wave function path 308 back to the point of separation 304. Once the first atomic wave function half and the second atomic wave function reach the point of separation 304, an interferometer cycle is complete as illustrated in FIG. 3C. At the point of separation, the wave function halves are recombined (416) and a phase readout is conducted (418). In an embodiment, the recombining is accomplished with a second Bragg $\pi/2$ pulse that recombines the atomic wave function. The resulting wave function follows the final path 312 illustrated in the FIGS. 3B and 3C. As discussed above, any relative phase now appearing in the atomic wave function in the final path 312 will result in a final superposition of momentum states that can be mapped back to internal states of the final Raman $\pi$ pulse, and read out using resonant absorption or fluorescent techniques known in the art. Although, flow diagram 400 sets steps for the formation of the fully reciprocal atomic interferometric gyroscope, the order in which the steps are taken may be changed in order in other embodiments to create other atomic interferometric gyroscopes.

When each atom splits into its two wave function halves that travel around the trajectories shown in 3A, 3B and 3C, rotation of the inertial sensor will cause the half of the wave function traveling along one path to pick up a different phase than the half traveling the other path. When the two halves are recombined, they are recombined with a phase shift such that some portion of the recombined atoms will shift from the first momentum state (i.e., the original ground state they possessed prior to the second momentum state) while the balance will retain the original ground state. The final Raman $\pi$ pulse then maps the two possible momentum states onto the two possible hyperfine ground states. The rotation rate about the sense axis can then be derived as a function of the number of atoms that retained the original ground state relative to the number that change internal state. These measurements may be obtained, for example, through a fluorescence analysis by exposing the recombined atoms to light of different frequencies. The frequency of light that causes fluorescence will indicate which ground state an atom possesses, and the relative responses of the sample to two different frequencies of light can thus be used to determine how many atoms are in each state. Accumulated phase differences in the recombined atoms due to rotation about the sense axis can then be measured to determine a rotation rate. See, U.S. Pat. No. 9,175,960 "Optically Dithered Atomic Gyro-Compass", U.S. Patent Publication 2013/0213135 "Atom Interferometer with Adaptive Launch Direction and/or Position" and U.S. Patent Publication 2014/0022534 "Closed Loop Atomic Inertial Sensor" each of which are incorporated herein by reference in their entirety.

In one embodiment, measurement cycles are alternated with cooling cycles. A cold sample is prepared from a laser cooling cycle. Then interferometry is performed on the sample of atoms using the optical lattices as discussed above. The atoms are then released from the optical lattices to repeat another cooling cycle. The next measurement cycle may be repeated within the same plane 202 as the previous measurement cycle, or shift to perform the fully reciprocal interferometry within another plane orthogonal to the previous plane.

Figure 5:
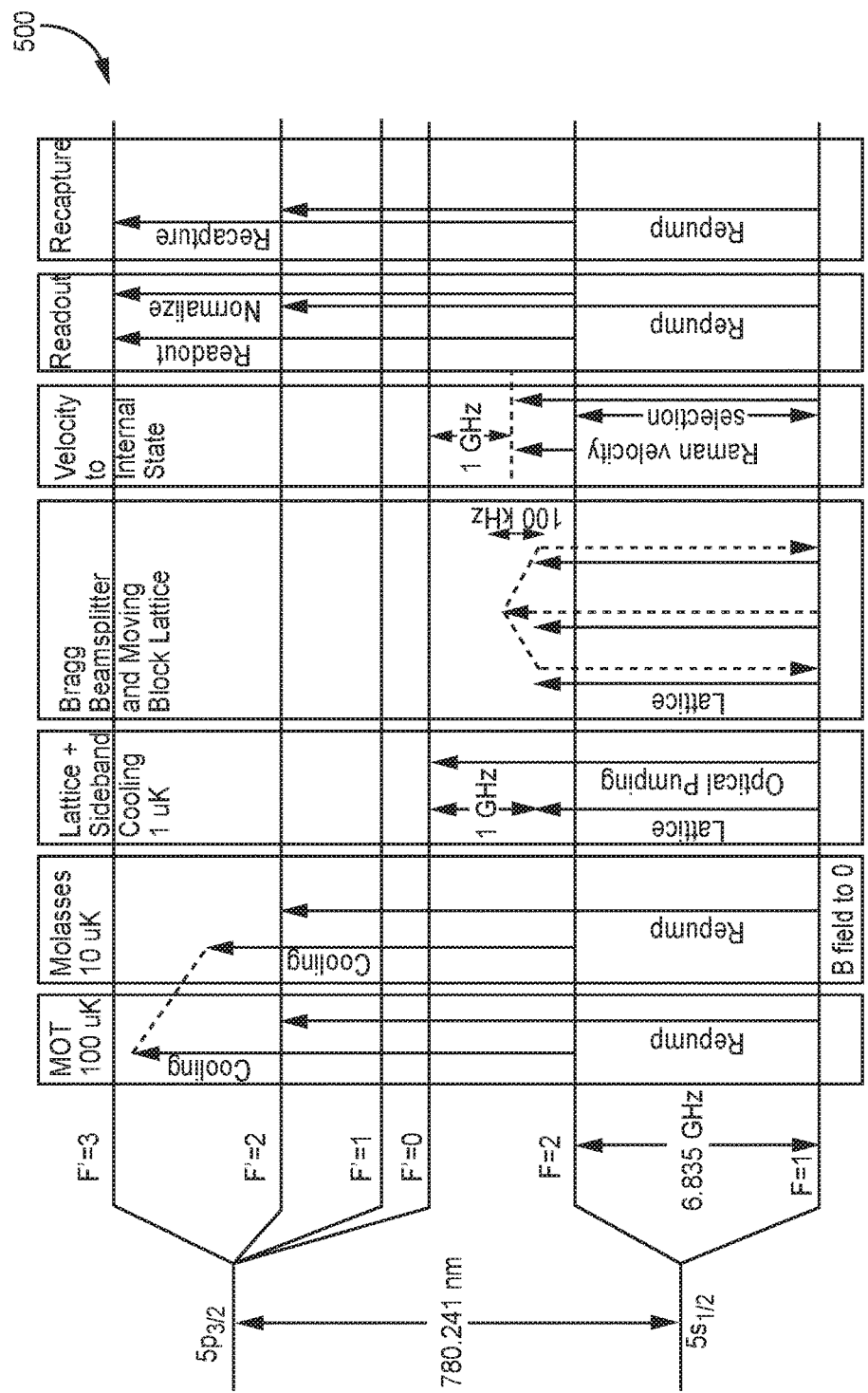
FIG. 5 is an energy level diagram illustrating various stages in an embodiment implementing rubidium atoms.

FIG. 5 illustrates an energy level diagram 500 for the various stages in an embodiment implementing rubidium atoms in a fully reciprocal atomic interferometric gyroscope. In particular, diagram 500 illustrates all relevant laser frequencies for the various stages superimposed on the rubidium atomic energy level diagram.

As discussed above, the embodiments presented herein add an optical lattice along the direction that is perpendicular to the axis of separation of the atomic wave function and an additional optical lattice is used to move atoms upwards during one cycle of horizontal expansion and contraction, and move the atoms downward during a second cycle of horizontal expansion and contraction, thus realizing a fully reciprocal atomic interferometric gyroscope in which the readout beam splitter is collocated with the entrance beam splitter. Thus, what is implemented with the embodiments presented herein is a true Sagnac interferometer, as opposed to a Mach-Zehnder interferometer. Further, because each half of each individual atom's wave function traverses exactly the same path, only in opposite directions, phase accumulation caused by any linear acceleration along the axis of separation sensed by the interferometer is canceled out from each half at the recombination point. That is, any linear acceleration induced phase accumulated on the way up is lost on the way back down. Any imperfections affecting the paths are also canceled out because each half of the atom would have experienced the same offsetting phase shift caused by the imperfection.

Figure 6:
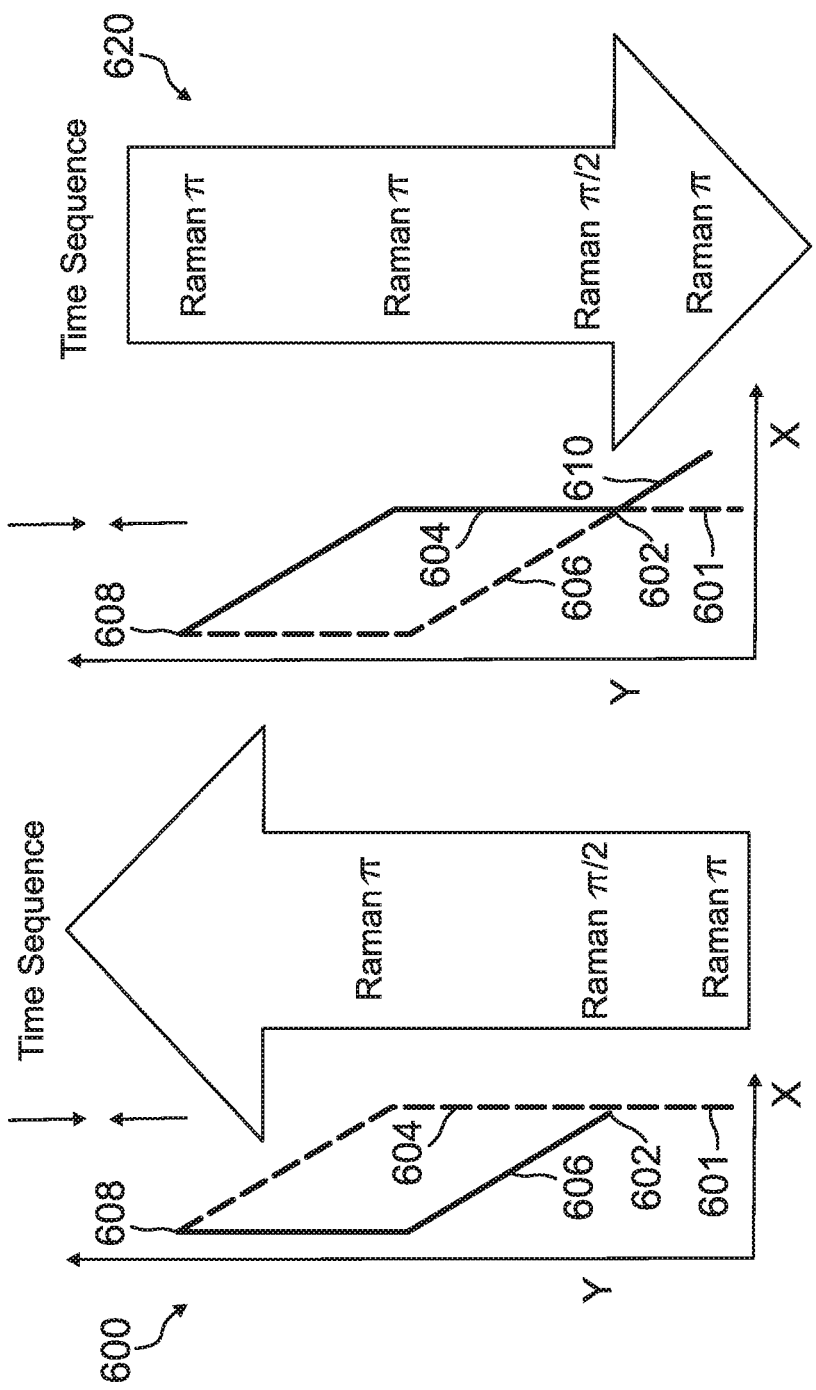
FIGS. 6A and 6B illustrate the operation of optical lattices to implement the fully reciprocal atomic interferometer of another embodiment of a fully reciprocal atomic interferometric gyroscope.
Figure 7:
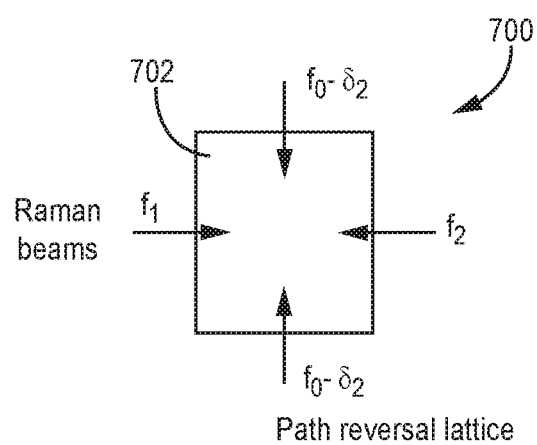
FIG. 7 is a diagram illustrating an example sensing plane in which an optical lattice is established of embodiment of FIGS. 6A and 6B.

Further, although the embodiments discussed above have discussed implementation of momentum state shifts using Bragg pulses, it should be understood that embodiments are not so limited and that other pulse series may be utilized. For example, another true Sagnac interferometer gyroscope may be realized by using Raman π and π/2 pulses to shift momentum states of the atoms as a vertical optical lattice moves the atoms up (shown in FIG. 6A) and then down (shown in FIG. 6B) again realizing a fully reciprocal atomic interferometric gyroscope where the readout beam splitter (the final Raman π/2 pulse) is collocated with the entrance beam splitter (the initial Raman π/2 pulse). An illustration of the positioning of the laser beams, including the Raman beams $f_1$ and $f_2$ and the laser beams $f_0+\delta_2$ and $f_0-\delta_2$ that form a single lattice in this embodiment in relation to a plane 702 that is transverse to a rotation axis along which rotation sensing is desired is provided in FIG. 7. FIG. 7 provide a representative diagram 700 illustrating laser beams used to form an optical lattices and a sensing plane 702.

Figure 8:
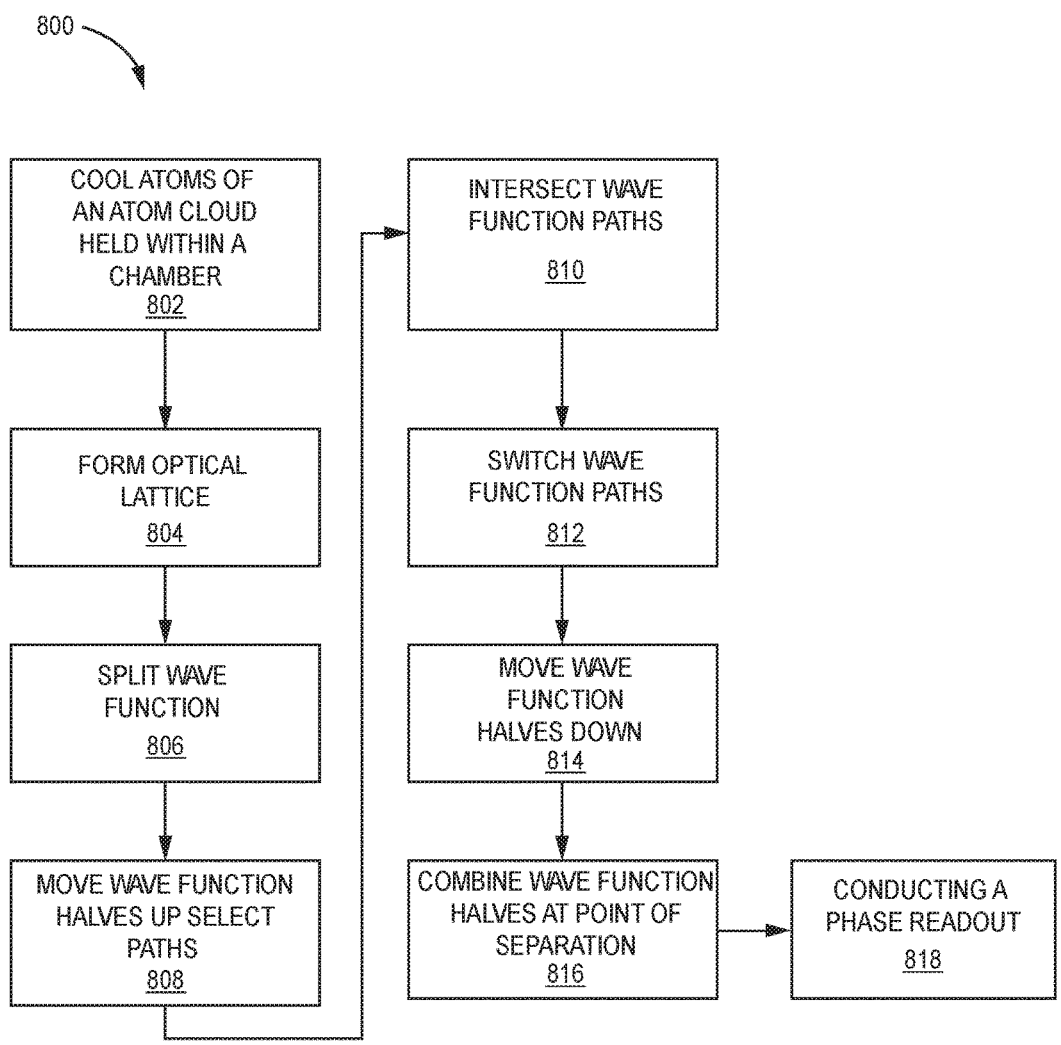
FIG. 8 is am atomic interferometer gyroscope flow diagram of the fully reciprocal atomic interferometric gyroscope of FIGS. 6A and 6B.

The steps are described in general in flow diagram 800 of FIG. 8 of this Raman only implementation which is further discussed below in view of FIGS. 6A, 6B and 7. Like the prior example embodiment, the atoms in the atom cloud that are held within the chamber are first cooled so that an optical lattice can be formed (802). In this example embodiment, once the atoms of the atomic cloud are cooled to the desired temperature (802), an optical lattice is formed with interfering laser beams of offset frequency $f_0-\delta_2$ and $f_0+\delta_2$ as illustrated in FIG. 7 (804). This moves a wave function in the y direction as illustrated by the initial path 601 in FIG. 6A. FIG. 6A illustrates the completion of a half cycle 600. At a point of separation 602, a Raman π/2 pulse formed by opposing Raman beams π/2 (where $f_1$ and $f_2$ is separated in frequency by a select amount) in the transverse direction from the $f_0+\delta_2$ and $f_0-\delta_2$ is used to split the beam. Since, $f_1-f_2=\delta_{HF}$ (hyperfine splitting) in this embodiment, the separation of paths will be less that a separation that is described in the above embodiment. This is because, the Raman lasers only transfer two photon recoils, whereas the Bragg beam splitter discussed above, transfers 4 to 8 recoils, and the optical lattice (Bloch oscillations) increase the path of separation from there. In an embodiment employing a rubidium atom cloud, the separation would be 6.8 gigahertz $(f_1-f_2=\delta)$ and an embodiment employing a cesium atom cloud, the separation would be 9.4 gigahertz in this embodiment. This beam splitting pulse (Raman π/2) separates the atoms not only into different momentum states but also different internal states (angular momentum states of the atom) resulting in a split wave function (806). At least one mirror is used to direct separate the paths of the split wave function. The optical lattice formed by the interfering laser beams of offset frequency f0+δ2 and f0−δ2 then move the split wave function halves in the Y direction as illustrated in FIG. 6A (808). In particular, a first atomic wave function half is moved up a first wave function path 604 and a second atomic wave function half is moved up a second wave function path 606.

A Raman π plus acts as a mirror to reverse the internal state labels of the two paths 604 and 606, and exchange their momentum, so that the two paths begin to converge again to a point of intersection 608 (810). A second Raman π pulse at the point of intersection 608 then causes the atomic wave function halves to switch paths and diverge (812). Further at the point of intersection 608, the direction of the optical lattice is switched by changing the offset frequency f0−δ2 and f0+δ2 to move the first atomic wave function half down the second wave function path 604 and the second atomic wave function half down the first wave function path 606 (814). A third Raman π pulse causes the final convergence at the point of separation 602 (816) before final readout. This is illustrated in FIG. 6B where a full cycle 620 is completed. At the point of separation 602, a final Raman π/2 pulse formed by opposing Raman beams π/2 is generated to recombine the wave function halves and travel along recombined path 610. A phase readout is then conducted at (818). In particular, as discussed in regards to the above embodiments, rotation of the inertial sensor will cause the half of the wave function traveling along one path to pick up a different phase than the half traveling the other path. When the two halves are recombined, they are recombined with a phase shift such that some portion of the recombined atoms will shift from the first momentum state (i.e., the original ground state they possessed prior to the second momentum state) while the balance will retain the original ground state. A final Raman π pulse then maps the two possible momentum states onto the two possible hyperfine ground states. The rotation rate about the sense axis can then be derived as a function of the number of atoms that retained the original ground state relative to the number that change internal state as discussed above.

Figure 9:
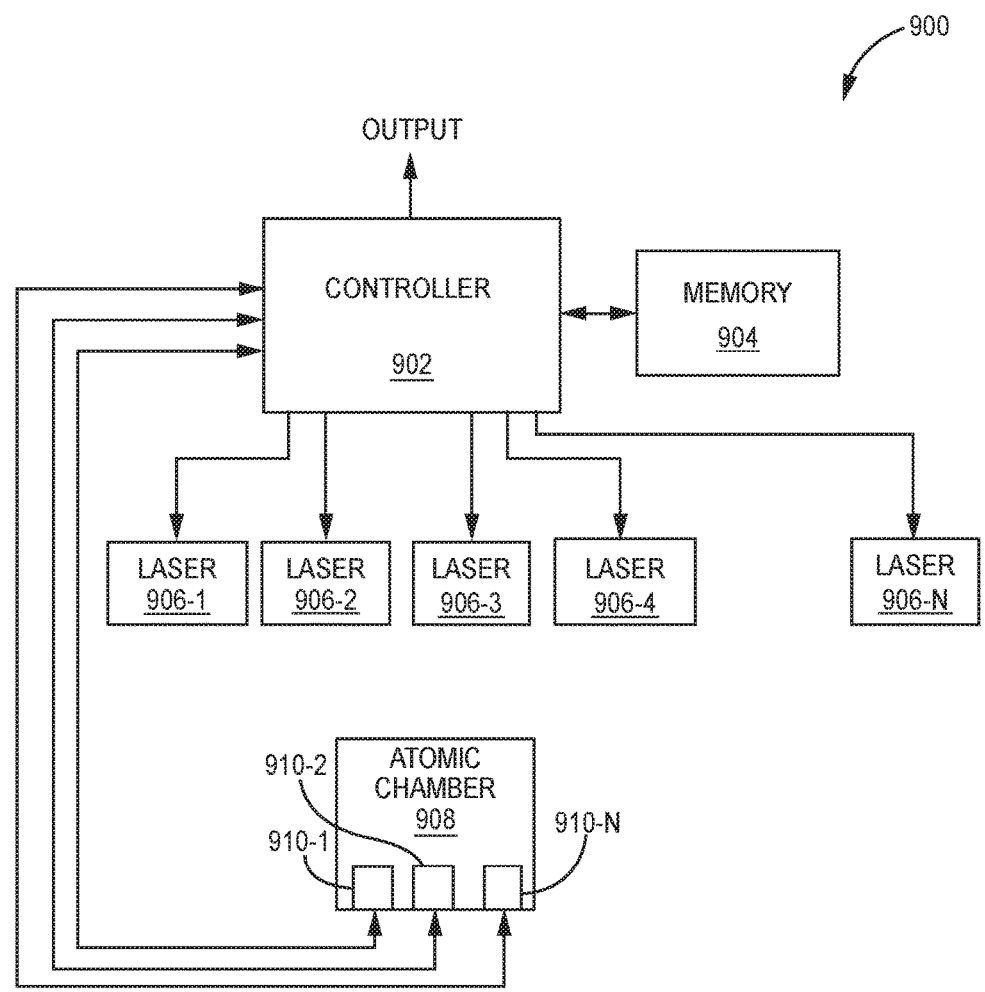
FIG. 9 is a block diagram of a fully reciprocal interferometric gyroscope of an embodiment.

Referring to FIG. 9, a block diagram of an interferometric gyroscope system 900 of an embodiment is illustrated. As the embodiment illustrates, the interferometric gyroscope system 900 includes a controller 902 to control operations of a plurality of lasers 906-1 through 906-N based on instructions stored in a memory 904. The lasers 906-1 through 906-N controlled by the controller 902 selectively provide laser beams through windows of the atomic chamber 908 as discussed above in embodiments. The controller 902 in this embodiment is further in communication with a plurality of sensors 910-1 through 910-N in or near the atomic chamber 908. The sensors 910-1 through 910-N may include at least one temperature sensor, at least one photodetector, a magnetic field sensor, etc. At least one of photodetector would be to measure the intensity of atom fluorescence. Other photodetectors may be used to stabilize laser intensities. The controller 902 is further configured to provide an output that may be used for navigation based on the phase readout sensor as illustrated in FIG. 9.

Example Embodiments

Example 1 includes a fully reciprocal atomic interferometric gyroscope. The fully reciprocal atomic interferometric gyroscope includes an atomic chamber, a plurality of lasers, a controller and measurement sensor. The atomic chamber is used to hold an atom cloud. The plurality of lasers are selectively positioned to selectively direct laser beams into the atomic chamber. The controller is configured to control the plurality lasers to initially cool the atom cloud to a point where at least one optical lattice can be formed that is used to move wave function halves of atoms of the atom cloud along split wave function paths that form an interferometer cycle. The measurement sensor is configured to conduct a phase readout of a wave function upon the completion of at least one interferometer cycle around the split wave function paths.

Example 2 includes the fully reciprocal atomic interferometric gyroscope of Example 1, further comprising a plurality of orthogonally oriented windows into the atomic chamber, each window positioned to allow a laser beam from an associated laser of the plurality of lasers to enter the atomic chamber.

Example 3 includes the fully reciprocal atomic interferometric gyroscope of any of the Examples 1-2, wherein the plurality of windows includes six windows.

Example 4 includes the fully reciprocal atomic interferometric gyroscope of any of the Examples 1-3, wherein the atoms are alkali atoms.

Example 5 includes the fully reciprocal atomic interferometric gyroscope of any of the Examples 1-4, wherein the alkali atoms are one of rubidium and cesium atoms.

Example 6 includes the fully reciprocal atomic interferometric gyroscope of any of the Examples 1-5, further comprising a beam splitter.

Example 7 includes the fully reciprocal atomic interferometric gyroscope of any of the Examples 1-6, wherein the beam splitter further comprises at least a pair of lasers of the plurality of lasers configured to split the wave function and recombine the wave function with at least one of a Bragg $\pi/2$ pulse and a Raman $\pi/2$ pulse.

Example 8 includes the fully reciprocal atomic interferometric gyroscope of any of the Examples 1-7, wherein at least one laser is configured to provide a $\pi$ pulse to direct the wave function halves of the atoms along the split wave function paths.

Example 9 includes a method of forming a fully reciprocal atomic interferometric gyroscope, the method includes cooling atoms of an atomic cloud held in a chamber. Once cooled, each atom is split into a first atomic wave function half and a second atomic wave function half at a point of separation. At least one optical lattice is used to move the first atomic wave function half along a first split wave function path and the second atomic wave function half along a second split wave function path in a first direction along a plane that is transverse to a rotation axis along which rotation sensing is desired. The first split wave function path and the second split wave function path are caused to intersect with each other to complete a first half of an interferometer cycle a select distance from the point of separation. The at least one optical lattice is used at least in part to move the first atomic wave function half along the second split wave function path and the second atomic wave function half along the first split wave function path in a second direction along the plane back to the point of separation to complete an interferometer cycle. A phase readout is conducted after at least one complete interferometer cycle.

Example 10 includes the method of Example 9, further comprising implementing a pair of overlapping optical lattices to control a separation distance of the first split wave function path from the second split wave function path.

Example 11 includes the method of any of the Examples 9-10, wherein implementing the pair of overlapping optical lattices to control the separation distance of the first split wave function path from the second split wave function path further comprises directing a first laser beam of frequency $f_0$ in a first direction into the atom cloud and a second laser beam of an offset frequency $f_0-\delta_2$ and a third laser beam of an offset $f_0+\delta_2$ in an opposite direction into the atom cloud.

Example 12 includes the method of any of the Examples 9-11, wherein cooling the atoms of the atom cloud held in the chamber further comprises cooling the atoms to a point where a velocity spread of the atoms is less than a velocity imparted to an atom by a scattering event with a photon.

Example 13 includes the method of any of the Examples 9-12, wherein the cooling of atoms of the atom cloud further comprises applying a plurality of lasers at a select frequency to cool and trap the atoms using at least one of a magneto-optical trap, optical molasses, Raman cooling and Raman velocity selection.

Example 14 includes the method of any of the Examples 9-13, wherein splitting each atom into a first atomic wave function half and a second wave function half at the point of separation further comprises placing each atom in a superposition of two momentum states.

Example 15 includes the method of any of the Examples 9-14, wherein placing each atom in a superposition of two momentum states further comprises flashing at least one of the at least one optical lattice with at least one of a half of a Bragg pulse and a Raman pulse.

Example 16 includes the method of any of the Examples 9-15, further comprises conducting a plurality of altered cooling cycles and measurement cycles.

Example 17 includes a method of forming a fully reciprocal atomic interferometric gyroscope, the method includes cooling atoms of an atom cloud held in a chamber until an optical lattice can be formed. A first optical lattice is used to move an atomic wave function of atoms of the cooled atom cloud in a first direction along a plane that is transverse to a rotational axis along which rotation sensing is desired. Each atom is split into a first atomic wave function half and a second wave function half at a point of separation. A pair of overlapping second optical lattices are used to control a separation distance of the first atomic wave function half from the second wave function half so the first atomic wave function half travels along a first split wave function path and the second wave function half travels along a second wave function path in the first direction. The pair of overlapping second optical lattices cause the first split wave function path and the second wave function path to intersect to complete a first half of an interferometer cycle at an intersection point that is a select distance from the point of separation. Upon reaching the intersection point, the first optical lattice is used to change movement of the first atomic wave function half and the second wave function half in a second direction that is opposite the first direction and using the pair of overlapping second optical lattices to cause the first atomic wave function half to move along the second split wave function path and the second atomic wave function half to move along the first split wave function path back to the point of separation to complete an interferometer cycle. A phase readout is then conducted.

Example 18 include the method of Example 17, wherein splitting each atom into a first atomic wave function half and a second atomic wave function half at the point of separation further comprises placing each atom in a superposition of two momentum states by flashing the pair of overlapping second optical lattices with a half of a Bragg pulse to cause each atom to diffract from an optical intensity grating with half of the atomic wave function being placed into a plus two recoil state and the other half of the atomic wave function being placed in a minus two recoil state.

Example 19 include the method of any of the Examples 17-18, wherein implementing the pair of overlapping second optical lattices to control a separation distance of the first atomic wave function half from the second atomic wave function half further comprises directing a first laser beam of a first frequency along the plane in a third direction into the atom cloud and directing a second laser beam of the first frequency minus a small frequency shift and a third laser beam of the first frequency plus a small frequency shift along the plane in a fourth direction that is opposite the third direction of the first laser beam into the atom cloud.

Example 20 include the method of any of the Examples 17-19, wherein using the first optical lattice to move the atomic wave function of atoms of the cooled atom cloud in the first direction further comprises directing a first laser beam having a frequency of $f_0+\delta_2$ in a first direction into the atom cloud and a second laser beam having a frequency of $f_0-\delta_2$ in a second opposite direction into the atom cloud, and wherein using the first optical lattice to change movement of the first atomic wave function half and the second atomic wave function half in the second direction that is opposite the first direction further includes, changing the frequency of the first laser beam to $f_0-\delta_2$ and the second laser beam to $f_0+\delta_2$.

In various alternative embodiments, system elements, processes, or examples described throughout this disclosure, such as but not limited to the laser controller 902 disclosed herein or subparts thereof, may be implemented on one or more computer systems, field programmable gate array (FPGA), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein such as memory 904. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method of forming a fully reciprocal atomic interferometric gyroscope, the method comprising:
   cooling atoms of an atomic cloud held in a chamber;
   splitting each atom into a first atomic wave function half and a second atomic wave function half at a point of separation;
   using at least one optical lattice to move the first atomic wave function half along a first split wave function path and the second atomic wave function half along a second split wave function path in a first direction along a plane that is transverse to a rotation axis along which rotation sensing is desired;
   causing the first split wave function path and the second split wave function path to intersect with each other to complete a first half of an interferometer cycle a select distance from the point of separation;
   using the at least one optical lattice to at least in part move the first atomic wave function half along the second split wave function path and the second atomic wave function half along the first split wave function path in a second direction along the plane back to the point of separation to complete an interferometer cycle; and
   conducting a phase readout after at least one complete interferometer cycle.

2. The method of claim 1, further comprising:
   implementing a pair of overlapping optical lattices to control a separation distance of the first split wave function path from the second split wave function path.

3. The method of claim 2, wherein implementing the pair of overlapping optical lattices to control the separation distance of the first split wave function path from the second split wave function path further comprises:
   directing a first laser beam of frequency $f_0$ in a first direction into the atom cloud and a second laser beam of an offset frequency $f_0-\delta_2$ and a third laser beam of an offset $f_0+\delta_2$ in an opposite direction into the atom cloud.

4. The method of claim 1, wherein cooling the atoms of the atom cloud held in the chamber, further comprises:
   cooling the atoms to a point where a velocity spread of the atoms is less than a velocity imparted to an atom by a scattering event with a photon.

5. The method of claim 1, wherein the cooling of atoms of the atom cloud further comprises:
   applying a plurality of lasers at a select frequency to cool and trap the atoms using at least one of a magneto-optical trap, optical molasses, Raman cooling and Raman velocity selection.

6. The method of claim 1, wherein splitting each atom into a first atomic wave function half and a second wave function half at the point of separation further comprises:
   placing each atom in a superposition of two momentum states.

7. The method of claim 6, wherein placing each atom in a superposition of two momentum states further comprises:
   flashing at least one of the at least one optical lattice with at least one of a half of a Bragg pulse and a Raman pulse.

8. The method of claim 1, further comprising:
   conducting a plurality of altered cooling cycles and measurement cycles.

9. A method of forming a fully reciprocal atomic interferometric gyroscope, the method comprising:
   cooling atoms of an atom cloud held in a chamber until an optical lattice can be formed;
   using a first optical lattice to move an atomic wave function of atoms of the cooled atom cloud in a first direction along a plane that is transverse to a rotational axis along which rotation sensing is desired;
   splitting each atom into a first atomic wave function half and a second wave function half at a point of separation;
   using a pair of overlapping second optical lattices to control a separation distance of the first atomic wave function half from the second wave function half so the first atomic wave function half travels along a first split wave function path and the second wave function half travels along a second wave function path in the first direction;

using the pair of overlapping second optical lattices to cause the first split wave function path and the second wave function path to intersect to complete a first half of an interferometer cycle at an intersection point that is a select distance from the point of separation;

upon reaching the intersection point, using the first optical lattice to change movement of the first atomic wave function half and the second atomic wave function half in a second direction that is opposite the first direction and using the pair of overlapping second optical lattices to cause the first atomic wave function half to move along the second split wave function path and the second atomic wave function half to move along the first split wave function path back to the point of separation to complete an interferometer cycle; and conducting a phase readout.

10. The method of claim 9, wherein splitting each atom into a first atomic wave function half and a second atomic wave function half at the point of separation further comprises:

placing each atom in a superposition of two momentum states by flashing the pair of overlapping second optical lattices with a half of a Bragg pulse to cause each atom to diffract from an optical intensity grating with half of the atomic wave function being placed into a plus two recoil state and the other half of the atomic wave function being placed in a minus two recoil state.

11. The method of claim 9, wherein implementing the pair of overlapping second optical lattices to control a separation distance of the first atomic wave function half from the second wave function half further comprises:

directing a first laser beam of a first frequency along the plane in a third direction into the atom cloud and directing a second laser beam of the first frequency minus a small frequency shift and a third laser beam of the first frequency plus a small frequency shift along the plane in a fourth direction that is opposite the third direction of the first laser beam into the atom cloud.

12. The method of claim 9, wherein using the first optical lattice to move the atomic wave function of atoms of the cooled atom cloud in the first direction further comprises:

directing a first laser beam having a frequency of $f_0+\delta_2$ in a first direction into the atom cloud and a second laser beam having a frequency of $f_0-\delta_2$ in a second opposite direction into the atom cloud, and wherein using the first optical lattice to change movement of the first atomic wave function half and the second atomic wave function half in the second direction that is opposite the first direction further includes, changing the frequency of the first laser beam to $f_0-\delta_2$ and the second laser beam to $f_0+\delta_2$.

* * * * *